Sept. 7, 1937. G. O. HILLIER 2,092,252
CONTINUOUS ROTARY DISK AND DRUM FILTER
Filed July 15, 1935 2 Sheets-Sheet 2
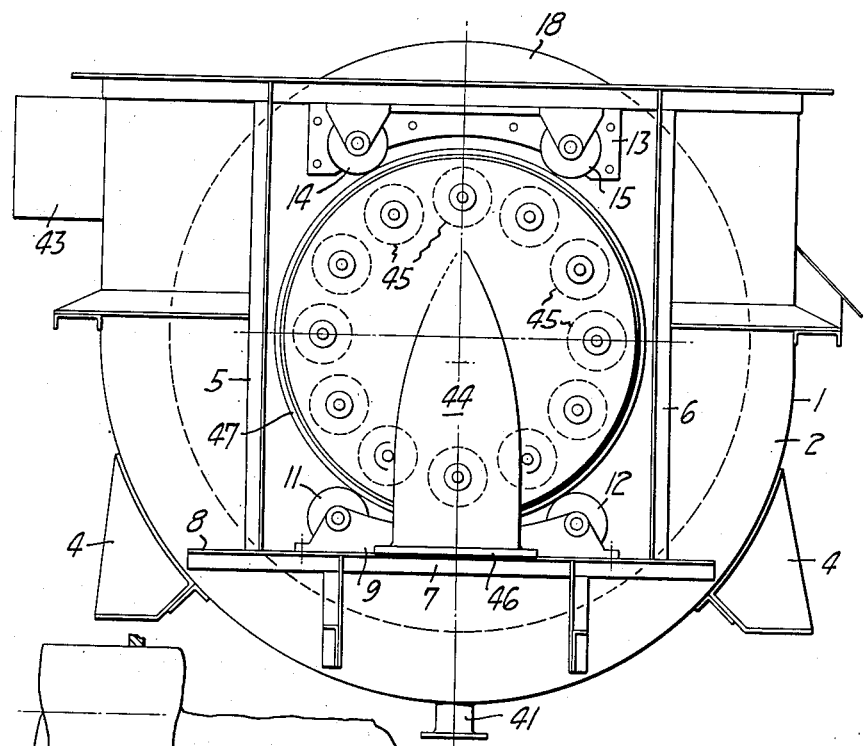
FIG_2_
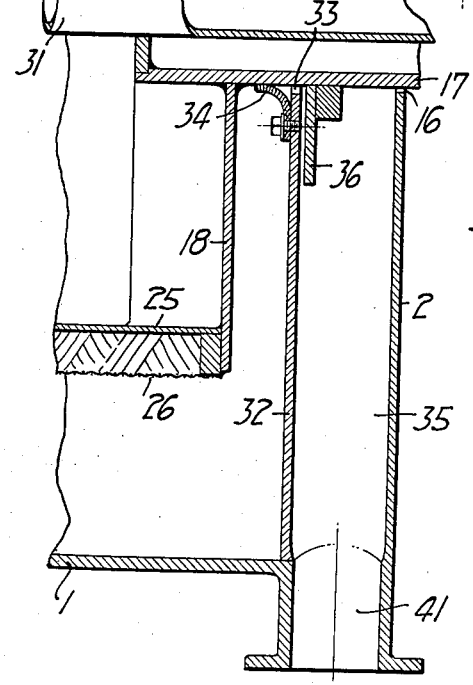
FIG_3_
INVENTOR.
Gerald O. Hillier
BY
ATTORNEY.

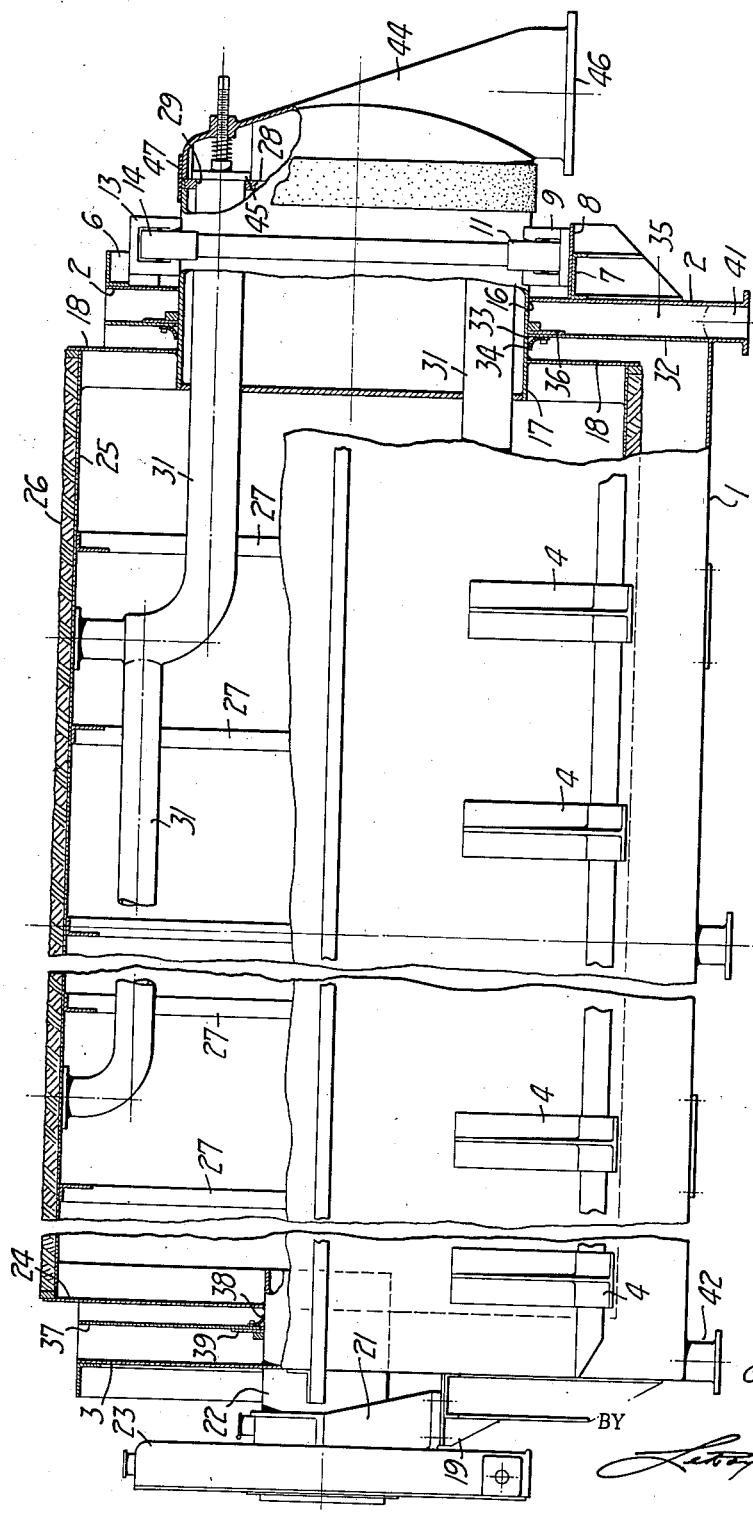

Patented Sept. 7, 1937

2,092,252

UNITED STATES PATENT OFFICE 2,092,252

CONTINUOUS ROTARY DISK AND DRUM FILTER

Gerald O. Hillier, Berkeley, Calif., assignor to Oliver United Filters Incorporated, San Francisco, Calif., a corporation of Nevada Application July 15, 1935, Serial No. 31,408

5 Claims. (Cl. 210—199)

This invention relates in general to continuous rotary disk and drum filters and in particular to means whereby the stuffing box and Babbitt bearing through which the trunnion on the valve end of the filter passes, may be eliminated.

In industrial filtration the character of the pulp, slurry or filtrant which a filter is intended to filter determines to a large extent the design of the filter, particularly with reference to its capacity. If the cake formed is relatively free filtering the filter must be capable of handling large volumes of filtrate while if the cake is not free filtering the filter need not be designed to handle large volumes of filtrate. The capacity of a filter depends to a large extent on the size of the filtrate valve and the piping connecting the valve with the filter compartments.

A high capacity filter requires that communication between the valve and filter compartments be established by relatively large pipes or conduits and this in turn means that the valve trunnion in which the conduits are formed or through which the pipes pass must be correspondingly large. In other words, in a filter having a given number of sections and therefore a corresponding number of filtrate pipes or conduits, the size of the trunnion determines and limits the cross-sectional size of the conduits. High capacity filters are usually of the high or deep submergence type, that is of the type where the filtrant is maintained at or above the level of valve trunnion. In the past this has necessitated that the ends of the filter tank be provided with stuffing boxes through which the trunnions may pass. Where the valve trunnions are of large diameters, the frictional resistance between the stuffing boxes and the trunnions becomes an important factor on account of power consumption to say nothing of the initial cost of the stuffing boxes.

The trunnions of continuous rotary filters are ordinarily journaled in Babbitt bearings and where a large diameter valve trunnion is found necessary the cost of a properly reinforced bearing of this type becomes excessive. An appreciation of this point may be obtained by giving a little consideration to the dimensions involved. A high capacity rotary drum filter having a six foot diameter drum divided into 18 compartments or sections each communicating with the filtrate valve by means of 8 inch diameter pipes requires a trunnion having a diameter of substantially 5 feet 6 inches. It will therefore be seen that the cost of a casting for a bearing to accommodate a trunnion of this size also becomes an important factor in the construction and cost of a filter. Furthermore, where filters of various sizes are required, patterns must be made for each of the bearing castings to be used.

In general the object of this invention is the provision of means whereby the stuffing boxes ordinarily associated with the trunnions of a continuous rotary filter may be dispensed with and an overflow compartment substituted in its place.

Another object of the invention is the elimination of the usual Babbitt bearing within which the valve trunnion of a continuous rotary filter is journaled and the substitution of roller bearings adjustably or detachably supported from the filter tank.

The invention possesses other advantageous features, some of which with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a side elevation of a sectionalized continuous rotary drum filter partly in section and in which the objects of my invention have been embodied.

Figure 2 is an end elevation of the valve end of the filter shown in Fig. 1.

Figure 3 is a detail of the overflow compartment and trunnion seal which I have substituted for the stuffing box ordinarily associated with the valve trunnion of a rotary filter.

My invention contemplates the use of a filtrate tank 1 provided with end heads 2 and 3 adapted to be mounted on a suitable concrete base (not shown) by means of feet 4 secured in any desired manner to the walls of the tank 1. The end head 2 is reinforced by means of vertical angle irons 5 and 6 and by a horizontally disposed channel 7. Disposed over the channel 7 is a plate 8 on which is supported a bracket 9 provided with rollers 11 and 12. To the upper end of the end head 2 is secured a bracket 13 provided with rollers 14 and 15. It is to be noted that the rollers 11, 12, 14 and 15 are concentrically disposed about a circular opening 16 formed in the end head 2 and through which a valve trunnion 17 is adapted to pass with substantial clearance. The orientation of the rollers 11, 12, 14 and 15 is such that they will snugly fit about and rotatably support the valve trunnion 17. Welded or otherwise secured to the outer surface of the valve trunnion 17 is a drum head 18.

Secured to the tank end head 3 by means of a bracket 19 is a bearing casting 21 within which is journaled a trunnion 22 by means of the usual Babbitt bearing. The bearing casting also carries a gear housing 23 within which is disposed a drive gear secured to the outer end of the trunnion 22 and by means of which the trunnion may be driven. Welded to the inner end of the trunnion 22 is a drum head 24 the outer diameter of which equals the outer diameter of the drum head 18. Disposed between the drum heads 18 and 24 and secured thereto is a cylindrical shell 25 about which is constructed a number of filtrate compartments covered with a filter medium 26 all substantially in accordance with the design of the filter disclosed in the Oliver Patent #919,628 of April 27, 1909. The shell 26 is preferably reinforced by means of fly rims or spiders 27.

Secured to the outer end of the valve trunnion 17 is a combined wear plate and pipe plate 28 provided around its periphery with a plurality of symmetrically spaced circular openings 29. The number of the openings 29 correspond to the number of sections or compartments into which the periphery of the filter drum is divided and communication between each of the sections or compartments and their corresponding openings 29 is established by means of pipes 31. Preferably each of the pipes 31 communicates with its corresponding section or compartment at two or more points so that the flow of filtrate through each filtrate compartment or section will be uniformly distributed throughout its length. Welded to the sides of the tank 1 intermediate the end head 2 of the tank and the drum head 18 is a false end head 32 provided with a central opening 33 through which the valve trunnion may pass with substantial clearance. If desired an annular flexible seal 34 made of rubber or other pliant material may be secured to the false end head 32 with its inner edge in sealed engagement with the valve trunnion 17. It will be noted that the false end head 32 defines with the end head 2 an overflow compartment 35 into which a certain amount of filtrant from the tank 1 may overflow through the circular opening 33 depending upon whether or not a seal 34 is used and its effectiveness. Secured to the valve trunnion 17 within the overflow compartment 35 and slightly spaced from the false end head 32 (Fig. 3) is a splash plate 36 the purpose of which is to prevent the splashing of filtrant through the circular opening 16 formed in the tank end head 2. In the absence of the seal 34, the amount of filtrant passing into the overflow compartment 35 can be controlled by simply varying the position of the plate 36 with respect to the false end head 32.

The drive end of the filter is provided with a false end head 37 similar to the false end head 32 on the valve end of the filter and likewise with an annular sealing member 38 and with a splash plate 39. A leakage drain 41 communicates with the overflow compartment 35 in the valve end of the filter and a similar leakage drain 42 communicates with the overflow compartment formed on the drive end of the filter. Each of these leakage drain pipes in turn communicates with the overflow from the flow box 32 (Fig. 2) from which the filtrant is introduced from its source of supply to the filter tank, or any other convenient source of disposal for recirculation.

It is to be noted that functionally the false end head 32 may be considered as the actual end of the tank 1 and that the overflow compartment 35 is external to the tank, the important feature being that the stuffing box usually associated with the trunnion may be dispensed with and the filtrant allowed to leak around the trunnion into an overflow compartment and from there returned to the flow box of the filter by means of a pump.

The outer end of the valve trunnion 17 registers with a housing 44 which carries in its upper end a spring operated valve 45 adapted to successively register with each of the circular openings 29 formed in the combined wear plate and pipe plate 28 during the rotation of the valve trunnion. The lower end of the housing 44 terminates in a vacuum connection 46 which at all times is in communication with the filtrate pipes 31 through the circular openings 29 except during the short interval of time during which any given opening 29 is in registration with the valve 45. Leakage about the joint formed between the valve trunnion 17 and the housing 44 is prevented by means of a deckle strap 47 secured to the housing 44. The valve 45 is so located with respect to the cycle of operation that it successively cuts off communication between the vacuum connection 46 and each of the filtrate compartments during the discharge period.

The operation of the filter above described is as follows: The filtrant to be filtered is introduced into the tank 1 by means of the flow box 43 and for high capacity operation is preferably maintained at or above the level of the axis of the valve trunnion, 17. The vacuum connection 46 is connected to a source of vacuum such as a vacuum pump or a barometric leg and the filter drum set in motion by means of the drive gear within the housing 23. A cake is picked up on the surface of the filter drum under the influence of vacuum in the usual manner and is successively discharged in any suitable manner from each compartment during the interval of time that any given compartment is cut off from the vacuum by means of the valve 45. Since no stuffing boxes have been used in connection with the trunnions 17 and 22 a slight amount of filtrant will leak through the openings in the false end heads 32 and 37 into the overflow compartments above described and will be recirculated to the flow box 43. If the annular seals 34 and 38 are resorted to only a very slight amount of filtrant will pass to the overflow compartment and at all events due to the presence of the splash plates 36 and 39 there will be no danger of the filtrant passing outwardly along the trunnions through the circular openings in the end heads 2 and 3.

It will be seen that by the above construction the stuffing boxes usually resorted to may be entirely eliminated with a substantial decrease in cost of construction. Furthermore, it will be noted that by merely shifting the location of the roller bearings 11, 12, 14 and 15 either inwardly or outwardly, trunnions of any desired diameter may be supported without the necessity of making large castings or having to have a number of different sized patterns on hand. Standardization is therefore made possible.

Obviously the invention is not limited to rotary drum filters but applies just as effectively to rotary disk filters.

I claim:

1. A rotary filter comprising: a tank provided with a trunnion opening in one end; a plurality of independent roller bearings secured to said tank in spaced relation around said trunnion opening; a trunnion extending through said opening and rotatably supported by said roller bearings; and a filter element secured to said trunnion within said tank.

2. A continuous rotary filter comprising: a tank provided with a trunnion opening in one end; an overflow compartment adjoining said tank and communicating therewith through said opening; a trunnion extending through said opening with positive clearance; and a filter element secured to said trunnion within said tank.

3. A continuous rotary filter comprising: a tank provided with a trunnion opening in one end; a plurality of spaced roller bearings secured to said tank concentrically with the opening therein; an overflow compartment adjoining said tank and communicating therewith through said opening; a trunnion extending through said opening and rotatably supported by said roller bearings and a filter element secured to said trunnion within said tank.

4. A continuous rotary filter comprising: a tank provided with a trunnion opening in one end; an overflow compartment adjoining said tank and surrounding the opening therein; a trunnion extending through said opening; a filter element secured to said trunnion within said tank; and a pliant sealing collar secured about said trunnion opening in contact with said trunnion.

5. A continuous rotary filter comprising: a tank provided with a trunnion opening in one end; an overflow compartment adjoining said tank and surrounding the opening therein; a trunnion extending through said opening; a filter element secured to said trunnion within said tank; and a splash ring secured to said trunnion within said overflow compartment and adjacent said trunnion opening.

GERALD O. HILLIER.